(12) United States Patent
Ling

(10) Patent No.: US 7,168,595 B2
(45) Date of Patent: Jan. 30, 2007

(54) PNEUMATIC GREASE GUN

(76) Inventor: Yung-Shing Ling, No. 19, Alley 6, Lane 100, Dongguangyuan Rd., East District, Taichung City (TW)

( * ) Notice: Subject to any disclaimer, the term of this patent is extended or adjusted under 35 U.S.C. 154(b) by 193 days.

(21) Appl. No.: 11/032,157

(22) Filed: Jan. 11, 2005

(65) Prior Publication Data

US 2006/0151540 A1 Jul. 13, 2006

(51) Int. Cl.
*G01F 11/00* (2006.01)
(52) U.S. Cl. ...................... 222/263; 222/262
(58) Field of Classification Search ............... 222/252, 222/256, 262, 263
See application file for complete search history.

(56) References Cited

U.S. PATENT DOCUMENTS

| | | | | |
|---|---|---|---|---|
| 5,685,462 | A | * 11/1997 | Barry | 222/262 |
| 6,494,347 | B1 | * 12/2002 | Yeh | 222/262 |
| 2005/0230430 | A1 | * 10/2005 | Linkletter et al. | 222/383.1 |

* cited by examiner

*Primary Examiner*—Gregory L. Huson
(74) *Attorney, Agent, or Firm*—Birch, Stewart, Kolasch & Birch, LLP

(57) ABSTRACT

A pneumatic grease gun has a first compressed air chamber formed between a sleeve and a first piston set, and a second compressed air chamber formed between the sleeve and a second piston set so that the pressure of compressed air is double to increase the thrust force to push grease therefore make replenishment of fresh grease more effective. Moreover, grease is blocked by the two piston sets and the sleeve so that grease is prevented from returning and clogging the air vane and the life span of the pneumatic grease gun increases.

3 Claims, 6 Drawing Sheets

PNEUMATIC GREASE GUN

FIELD OF THE INVENTION

The present invention relates to a pneumatic grease gun and particularly to a pneumatic grease gun capable of doubling thrust force to dispense grease.

BACKGROUND OF THE INVENTION

Heavy duty machinery, trucks or trailers often have to receive grease in the gear box or transmission axle to do lubrication and prevent rusting. During maintenance, hardened grease has to be removed and fresh grease has to be replenished to make rotation of the gears or transmission axle easier, and also guard against rust. As the gear box usually has a complicated structure and a small space that make manual dispensing of grease difficult, a pneumatic grease gun has been developed to overcome this problem. Refer to FIGS. 1 and 2 for a conventional pneumatic grease gun. It has a gun body 1 to inject grease contained in a storage barrel 2 into the gear box or transmission axle to remove hardened grease and replenish fresh grease. Although it makes replenishing grease easier than the manual operation, it still has problems during operation, notably:

1. The conventional pneumatic grease gun has a piston 3 made of a pliable material. The piston 3 tends to wear off after moving to and fro for a period of time. As a result, air leakage occurs, and the thrust force to deliver grease decreases. When the thrust force is smaller than the returning elastic force of a reciprocal spring 4, grease cannot be dispensed effectively.

2. With the piston 3 of the conventional pneumatic grease gun wearing off, a portion of grease is squeezed back to the compressed air chamber 5 and clogs the air vane 6. As a result, the grease gun cannot function normally.

SUMMARY OF THE INVENTION

Therefore the primary object of the invention is to provide an improved pneumatic grease gun that has a cylinder and two piston sets to compress air twice and form a double thrust force so that grease can be injected as desired.

Another object of the invention is to prevent grease from returning and clogging the air vane through the cylinder and two piston sets and to increase the life span of the grease gun.

Yet another object of the invention is to provide a lid on the front side of the piston, and a reinforced disk in front of and behind the piston of the piston sets to increase the strength of the piston.

The invention mainly includes a hilt, a coupling duct and a storage barrel. The hilt has a hollow sleeve on a front end and an air intake nozzle on a tail end for air entering, and a channel in the interior to bridge the sleeve and the air intake nozzle. The hilt further has a trigger to control air entering. The coupling duct is fastened to the front end of the sleeve through a plurality of bolts. The coupling duct has a front end to couple with a dispensing tube and a lower end which has a cap. The cap has a passage communicating with the interior of the coupling duct. The storage barrel contains grease and has a handle on a bottom end to squeeze grease. The storage barrel is fastened to the cap.

A thrust assembly is provided and located between the coupling duct and the storage barrel. The thrust assembly includes a cylinder which has an aperture in the center of the cylinder bottom, and a first piston set and a second piston set located respectively on a front side and a rear side of the cylinder. The first and second piston sets have respectively a piston and a strut running through the piston and coupling therewith to become one body. The strut is hollow and has a front end coupling with a compression spring. By means of the elements set forth above, when compressed air enters a first compressed air chamber formed between the sleeve and the first piston set and a second compressed air chamber formed between the second piston set and the sleeve, a double compression takes places and the thrust force increases to make injection and replenishment of grease more effective.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
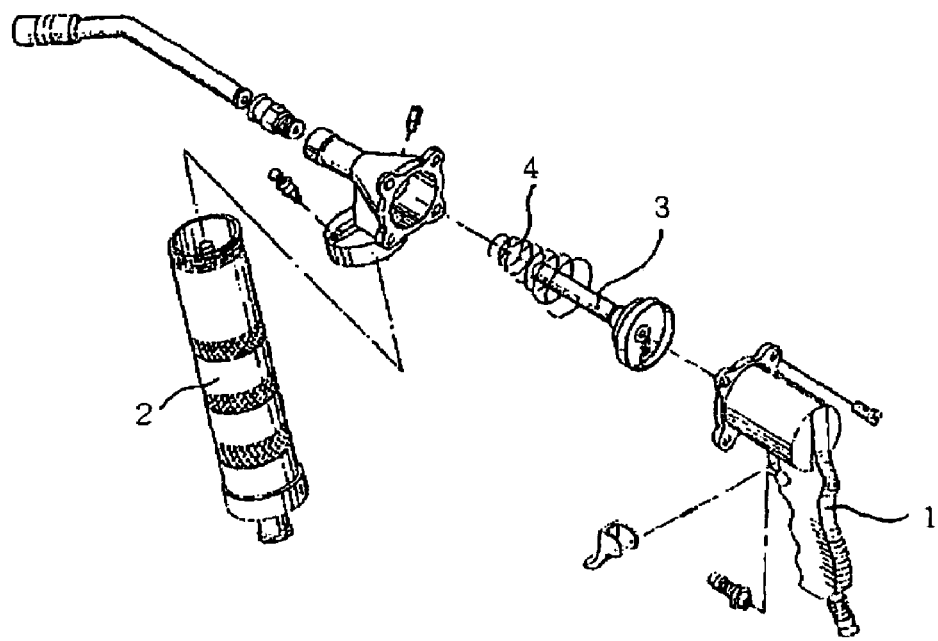
FIG. 1 is an exploded view of a conventional pneumatic grease gun.
Figure 2:
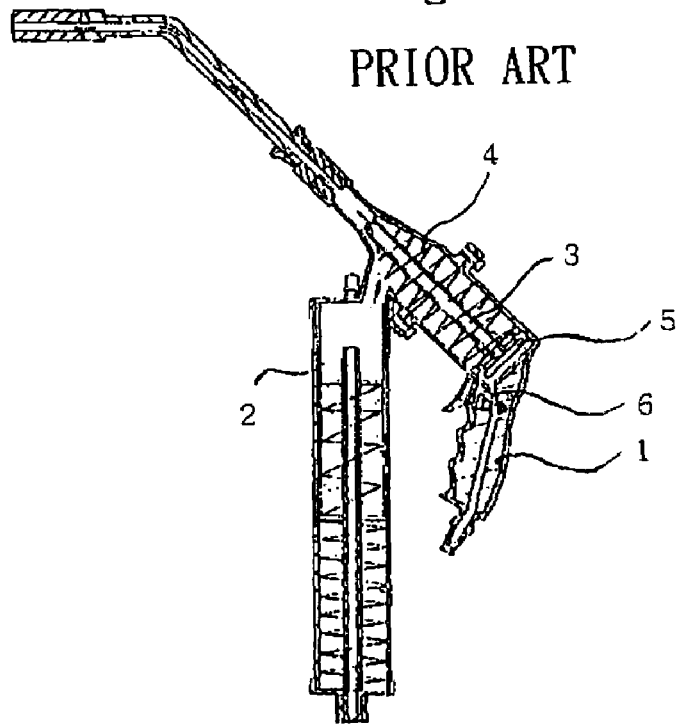
FIG. 2 is a sectional view of a conventional pneumatic grease gun.

Please referring to FIGS. 3, 4A, 4B and 5, the present invention mainly includes:

(a) A hilt 10 has a hollow sleeve 11 on a front end, an air intake nozzle 12 on a tail end and a channel 13 in the interior to bridge the sleeve 11 and the air intake nozzle 12. The hilt 10 further has a trigger 14 to control entering of air.

(b) A coupling duct 20 is fastened to the front end of the sleeve 11 through a plurality of bolts 21. The coupling duct 20 has a front end to couple with a dispensing tube 22 and a lower end which has a cap 23. The cap 23 has a passage 24 communicating with the interior of the coupling duct 20;

(c) A storage barrel 30 for containing grease is fastened to the cap 23. It has a handle 31 on a bottom end to squeeze grease.

(d) A thrust assembly 40 is located between the coupling duct 20 and the storage barrel 30. The thrust assembly 40 includes a cylinder 41 which has an aperture 411 in the center of the cylinder bottom to couple with a grease seal 412 to prevent air leakage, and a first piston set 42 and a second piston set 43 located respectively on a front side and a rear side of the cylinder 41. The first and second piston sets 42 and 43 have respectively a piston 421, 431 that are coupled respectively with a lid 422, 432 on a front side and a reinforced disk 423, 433 on the front side and a rear side to increase the strength of the pistons 421 and 431. The pistons 421 and 431 further are run through respectively by a first strut 424 and a second strut 434 and are fastened by a bolt to become one body respectively. The first strut 424 is hollow. The front sides of the struts 424 and 434 are coupled respectively with a compression spring 425, 435.

Figure 3:
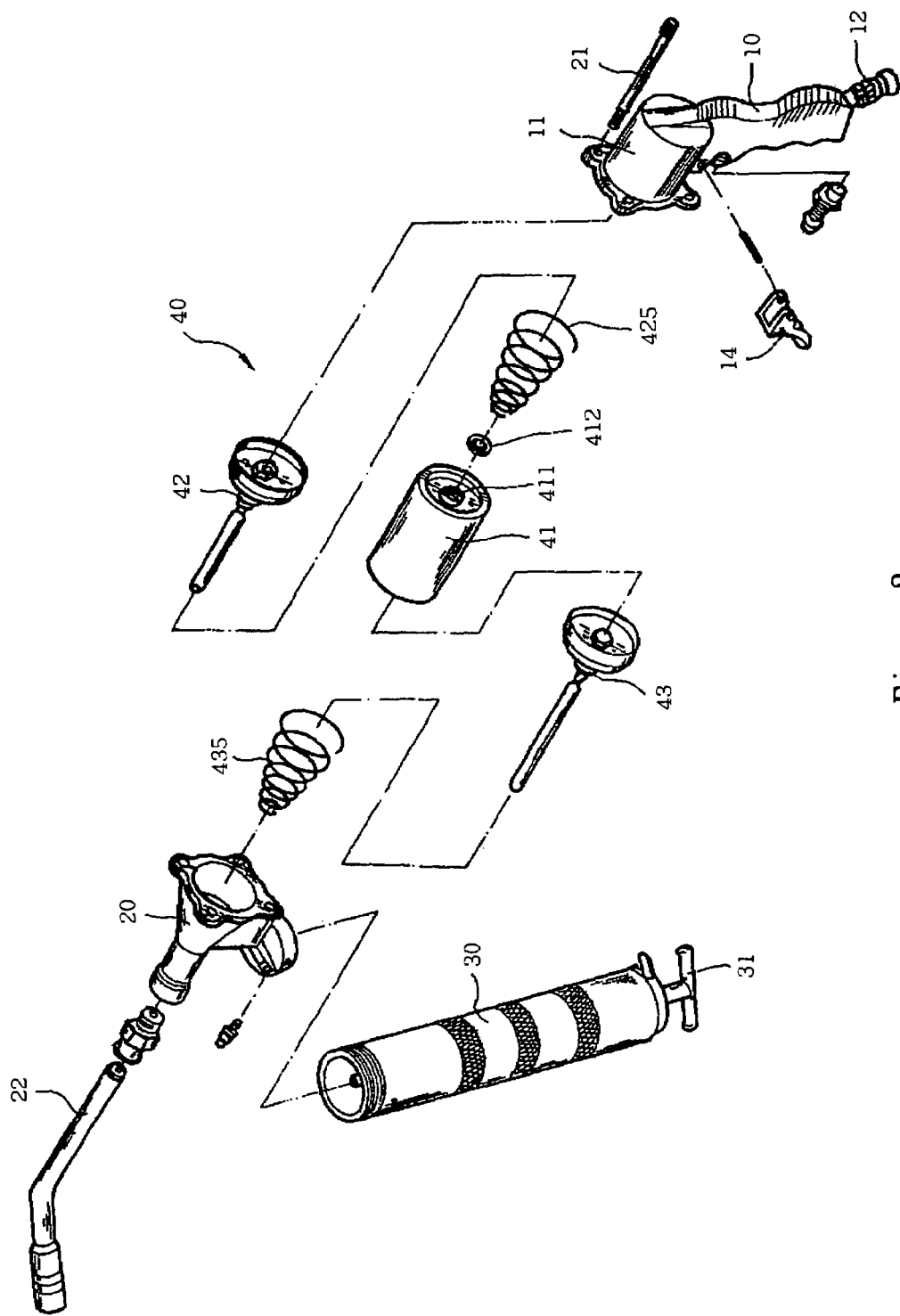
FIG. 3 is an exploded view of an embodiment of the present invention.
Figure 4A:
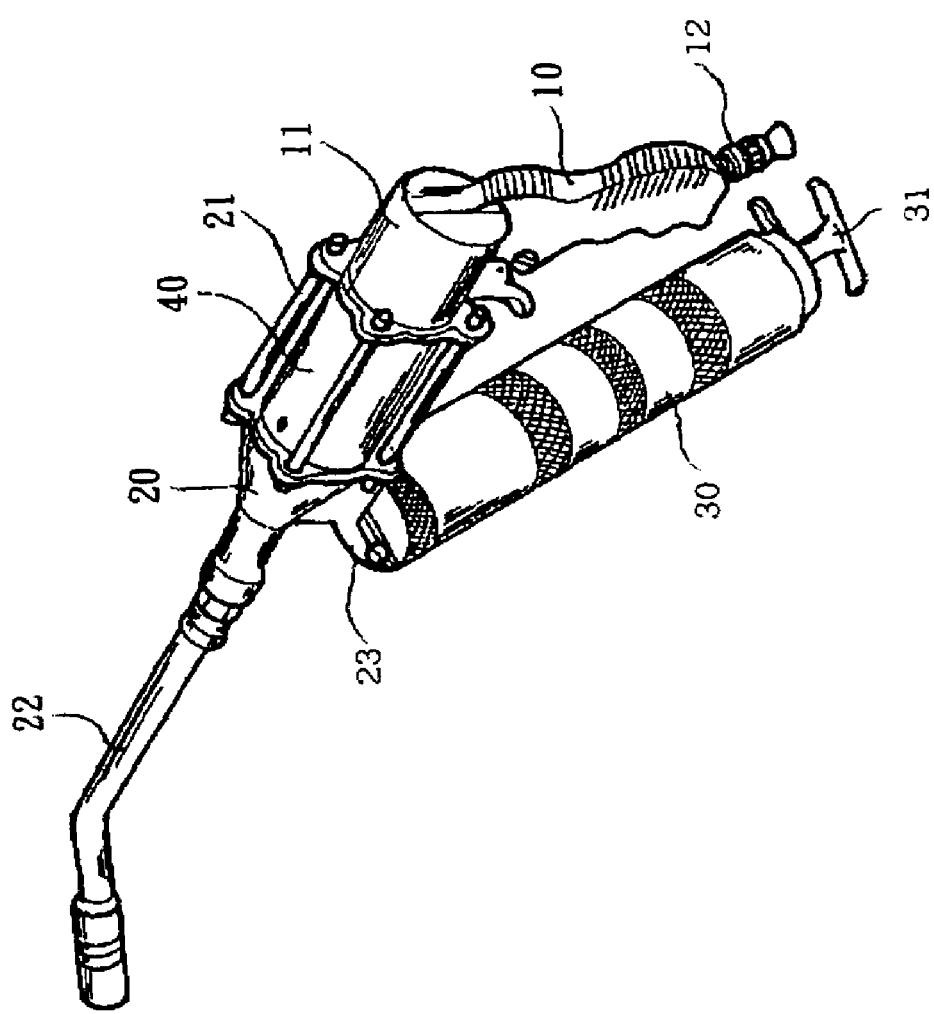
FIG. 4A is a perspective view of an embodiment of the invention.
Figure 4B:
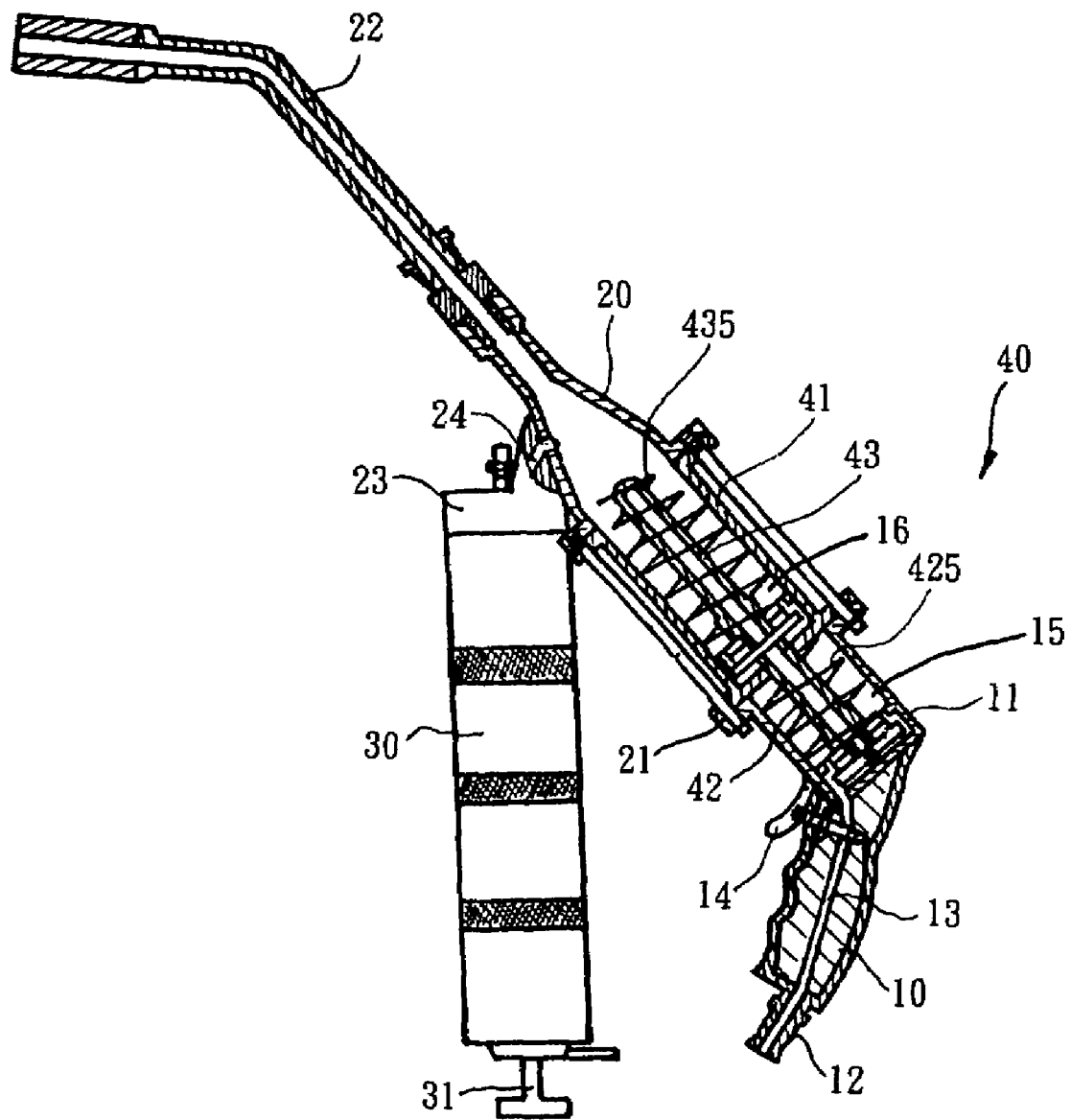
FIG. 4B is a sectional view of an embodiment of the invention.

Referring to FIGS. 3 and 4A, after the invention is assembled, the cylinder 41 of the thrust assembly 40 extends the distance between the storage barrel 30 and the hilt 10. As a result, the gravity center of the entire body is skewed outwards that makes holding difficult. To remedy this problem, the storage barrel 30 of the invention is fastened to the cap 23 at a biased angle (about 10–15 degrees) directing inwards to move the gravity center close to the handgrip so that holding the grease gun is easier.

Figure 4C:
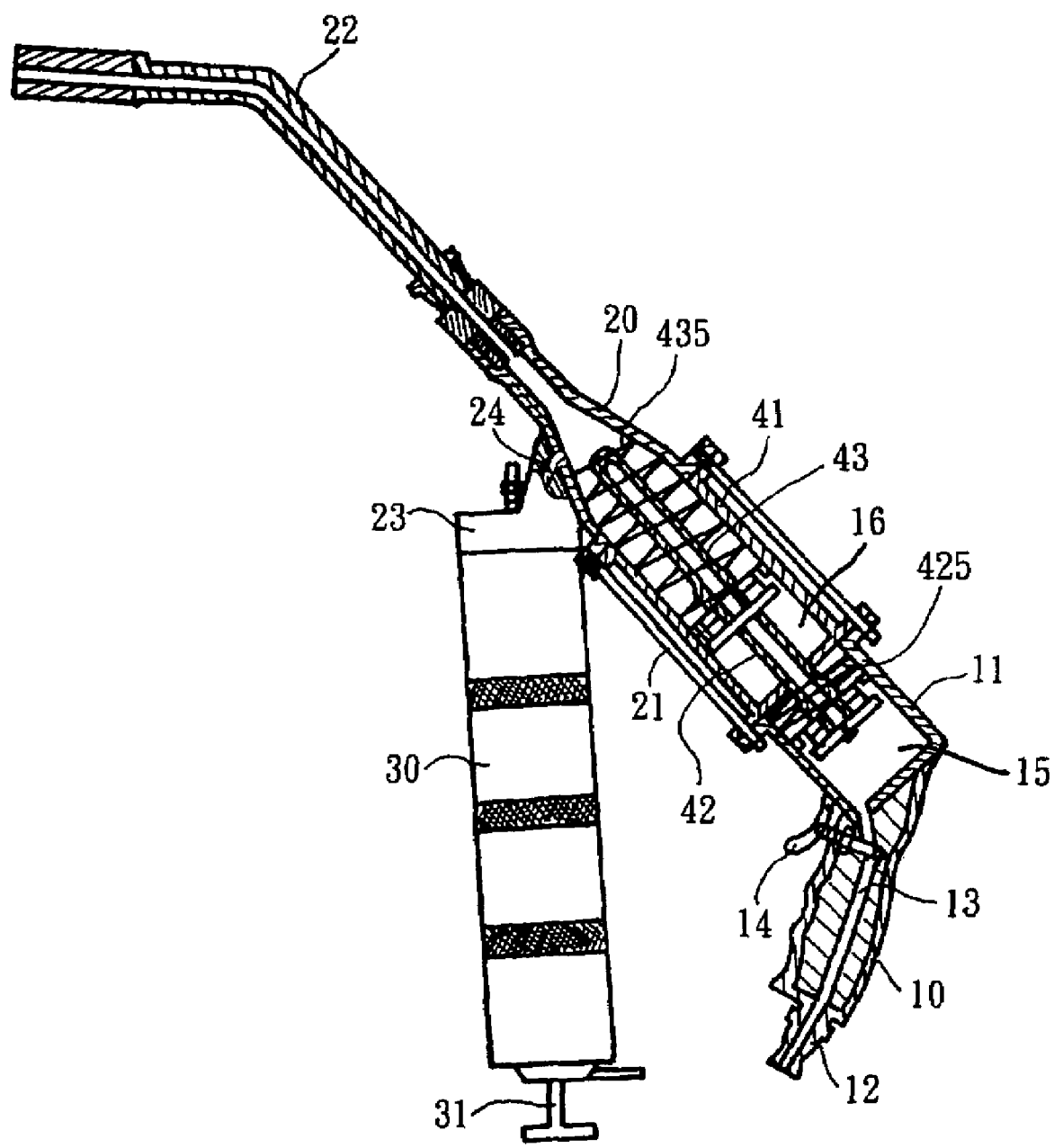
FIG. 4C is a schematic view of an embodiment of the invention in an operating condition.
Figure 5:
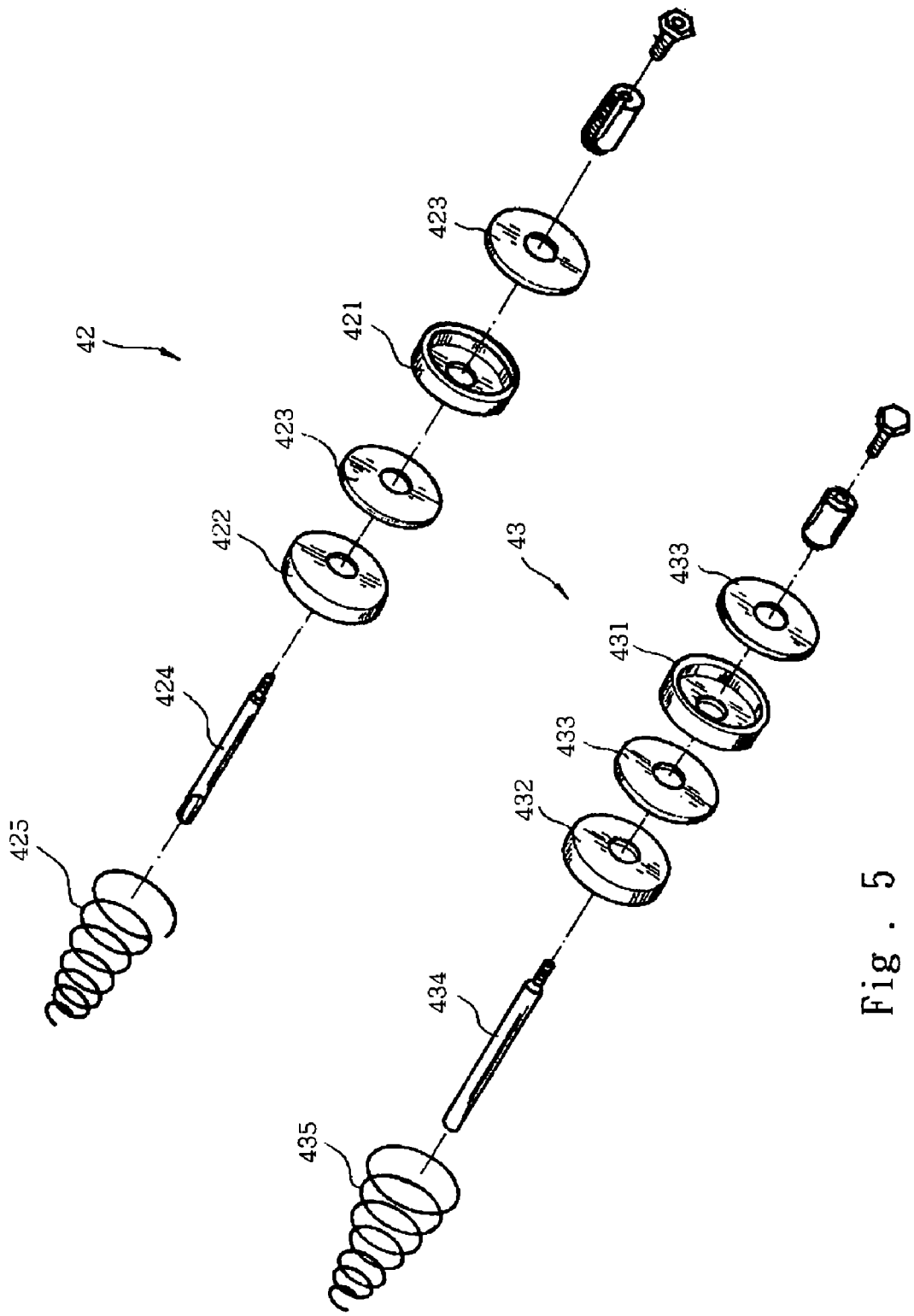
FIG. 5 is an exploded view of the first and the second piston sets of the present invention

When in use, depress the trigger 14 to release the compressed air through the air intake nozzle 12 and the channel 13 to the first compressed air chamber 15 (formed between the sleeve 11 and the first piston set 42). The air pressure exceeds the elastic force of the compression spring 425 and pushes the first piston set 42 forwards, and also pushes the second piston set 43 forwards. The air enters the second compressed air chamber 16 formed between the second piston set 43 and the sleeve 11 through the first strut 424. The second piston set 43 is pushed forwards again. As the sleeve 11 and the second piston 43 are being pushed at the same time, a double pressure is formed which is greater than the pressure of the conventional pneumatic grease gun. Meanwhile, the handle 31 may be pushed upwards to move grease contained in the storage barrel 30 into the coupling duct 20. Grease is pushed forwards by the second piston set 43 and ejected through the dispensing tube 22 into a desired location (referring to FIG. 4C). Thus the double pressure can increase the thrust force to inject fresh grease and squeeze used grease out for replenishment.

The invention employs two piston sets and a sleeve to form two compressed air chambers to double the pressure. And the thrust force to push grease increases. Replenishment of fresh grease can be done more effectively. Moreover, the two piston sets and the sleeve can block grease and prevent grease from returning and clogging the air vane. The life span of the pneumatic grease gun increases.

What is claimed is:

1. An improved pneumatic grease gun, comprising:
   a hilt having a hollow sleeve on a front end, an air intake nozzle on a tail end, a channel in the interior bridging the sleeve and the air intake nozzle, and a trigger to control air entering;
   a coupling duct fastened to a front end of the sleeve through a plurality of bolts having a front end thereof to couple with a dispensing tube and a lower end which has a cap, the cap having a passage communicating with the interior of the coupling duct;
   a storage barrel for containing grease being fastened to the cap and having a handle on a bottom end to squeeze grease; and
   a thrust assembly located between the coupling duct and the storage barrel including a cylinder which has an aperture in the center of the cylinder bottom, and a first piston set and a second piston set located respectively on a front side and a rear side of the cylinder, the first and the second piston sets having respectively a first piston and a second piston that are run through respectively by a first strut and a second strut to form an integrated body, the struts being hollow and having a front end to couple with a compression spring;
   wherein the sleeve and the first piston set form a first compressed air chamber and the sleeve and the second piston set form a second compressed air chamber, compressed air being delivered to the first compressed air chamber and the second compressed air chamber to double compression and increase thrust force to replenish grease.

2. The improved pneumatic grease gun of claim 1, wherein the first piston and the second piston have respectively a lid on a front side and a reinforced disk on the front side and a rear side to increase the strength of the pistons.

3. The improved pneumatic grease gun of claim 1, wherein the aperture of the cylinder is coupled with a grease seal to prevent air leakage.

* * * * *